United States Patent [19]

Campen

[11] 4,358,727

[45] Nov. 9, 1982

[54] ECONOMICAL FLYWHEEL ALTERNATOR FOR TRICKLE CHARGING A SMALL LAWNMOWER BATTERY

[75] Inventor: Kenneth W. Campen, Kiel, Wis.

[73] Assignee: Tecumseh Products Company, Tecumseh, Mich.

[21] Appl. No.: 190,897

[22] Filed: Sep. 25, 1980

[51] Int. Cl.[3] .................... H02K 7/02; H02K 21/22; H02P 9/00

[52] U.S. Cl. .................... 322/90; 310/70 A; 310/153; 320/57

[58] Field of Search .................... 310/70 A, 70 R, 153; 322/89, 90, 91, 1; 320/57, 59, DIG. 2, 2

[56] References Cited

U.S. PATENT DOCUMENTS

| | | | |
|---|---|---|---|
| 3,009,092 | 11/1961 | Carmichael | 322/90 X |
| 3,484,677 | 12/1969 | Piteo | 322/91 |
| 3,623,467 | 11/1971 | Piteo | 123/149 D |
| 3,629,632 | 12/1971 | Loupe | 310/153 X |
| 3,894,281 | 7/1975 | Bloomfield | 322/1 |
| 4,061,121 | 12/1977 | MacLeod | 310/70 A X |

FOREIGN PATENT DOCUMENTS

| | | | |
|---|---|---|---|
| 1194361 | 6/1967 | United Kingdom | 310/70 |

*Primary Examiner*—R. J. Hickey
*Attorney, Agent, or Firm*—Albert L. Jeffers; Roger M. Rickert

[57] ABSTRACT

The laminated stator core for an engine ignition system includes in addition to that ignition system an arrangement for charging the storage battery of an internal combustion engine powered device during engine operation with a charging coil surrounding one leg of the ignition stator core and a rectifier coupled to the charging coil for conveying a varying unidirectional current to the battery. The ignition system may be of the type having a three legged E-shaped laminated stator core and a flywheel supported permanent magnet with charging coils being positioned on each of the outer E legs with diodes in series with each charging coil and means connecting the two coil-diode series circuits in parallel with one another and to the battery for providing a pair of sequential primary charging current pulses to the battery during each revolution of the flywheel. A fourth laminated stator core leg supporting a charging coil may be employed in some circumstances.

2 Claims, 7 Drawing Figures

ECONOMICAL FLYWHEEL ALTERNATOR FOR TRICKLE CHARGING A SMALL LAWNMOWER BATTERY

BACKGROUND OF THE INVENTION

The present invention relates generally to internal combustion engine electrical systems and more particularly to a combined ignition-alternator arrangement for small electric start internal combustion engine powered devices.

High voltage ignition systems and low voltage electrical sources in internal combustion engine powered devices are both commonplace and are generally quite independent of one another.

A number of different small engine ignition systems employ a U-shaped or E-shaped stator member supporting one or more ignition coils and positioned closely adjacent the engine flywheel. The flywheel supports a magnetic member which rotates past the stator, inducing the ignition voltages in the coils. A permanent magnet is generally part of the system and may be either on the flywheel or a part of the stator. In those situations where the permanent magnet is a part of the flywheel structure, this permanent magnet has on occasion been utilized to also provide a low voltage battery charging function by positioning a second independent stator structure adjacent the flywheel with a low voltage coil on that second stator structure so that when the permanent magnet rotates past this independent stator structure, a low voltage is introduced in the coil for battery charging purposes. With such an arrangement there are two stator structures to be attached to the engine representing a significant expenditure for materials as wall as assembly.

SUMMARY OF THE INVENTION

Among the several objects of the present invention may be noted the provision of a low voltage trickle charger for an internal combustion engine powered device; the elimination of the cost of a laminated stator core as well as one step in an engine assembly process with the retention of a battery charging capability; the provision of an internal combustion engine driven electrical energy source of minimum cost; the utilization of an existing ignition structure to provide a battery charging function with minimal additional components; the provision of a magnetic circuit which is shared by an ignition system and an alternator; the provision of an improved ignition stator having battery charging capabilities; and the elimination of an alternator stator structure with the retention of an alternator function in a small electric start internal combustion engine environment. These as well as other objects and advantageous features of the present invention will be in part apparent and in part pointed out hereinafter.

In general, an arrangement for charging a storage battery during engine operation includes a charging coil surrounding one leg of an ignition stator core with a rectifier coupled to the charging coil and circuitry for conveying a varying unidirectional current from the coupled rectifier and charging coil to the battery.

Also in general and in one form of the invention, a generally E-shaped ignition stator core has battery charging coils on each of the outer E legs with diodes connected in series with each coil and the coil-diode series circuits connected in parallel with one another and to a storage battery so that sequential primary charging current pulses are delivered tothe battery during each revolution of an engine flywheel.

Still further in general and in one form of the invention, a generally E-shaped ignition statoe core is provided with a fourth leg having a free end thereof closely adjacent the engine flywheel and supporting a battery charging coil. The flywheel includes a magnetic member for coupling the legs in pairs so as to introduce a battery charging pulse in the charging coil as well as ignition pulses in the ignition circuitry associated with the E shaped core. The voltage induced in the charging coil is rectified and employed for battery charging purposes.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
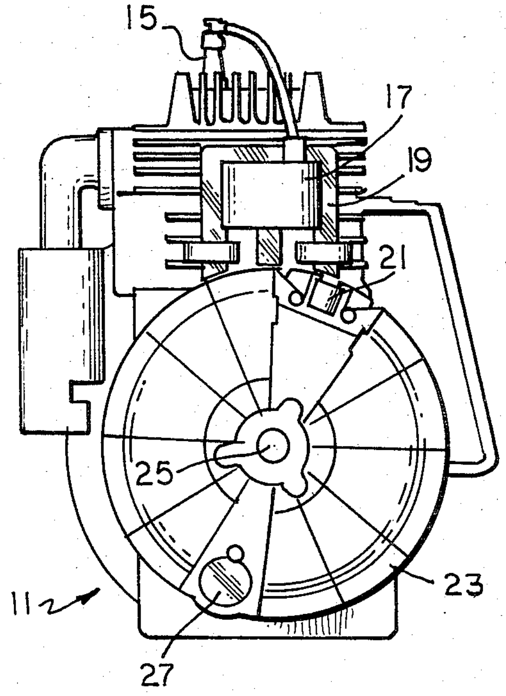
FIG. 1 is a plan view of an internal combustion engine having an ignition stator structure mounted closely adjacent the engine flywheel.

Referring to the drawing generally, the internal combustion engine 11 powers a device, such as a lawnmower having an electric start feature, energized by a storage battery 13. The engine also has an ignition system including a sparkplug 15 which receives ignition pulses from a high voltage coil and associated circuitry 17 supported on a laminated stator core 19. The ignition pulses are induced by passage of a permanent magnet 21 supported on the engine flywheel 23. The engine as illustrated in FIG. 1 is generally of conventional construction and of a type currently commercially available. Flywheel 23 is fastened to the engine crankshaft 25 and may include a counter-balancing weight 27 as well as peripheral teeth (not shown) engageable by a battery energizable engine starter. Crankshaft 25 is of course also coupled to the engine powered device, for example a lawnmower.

Figure 2:
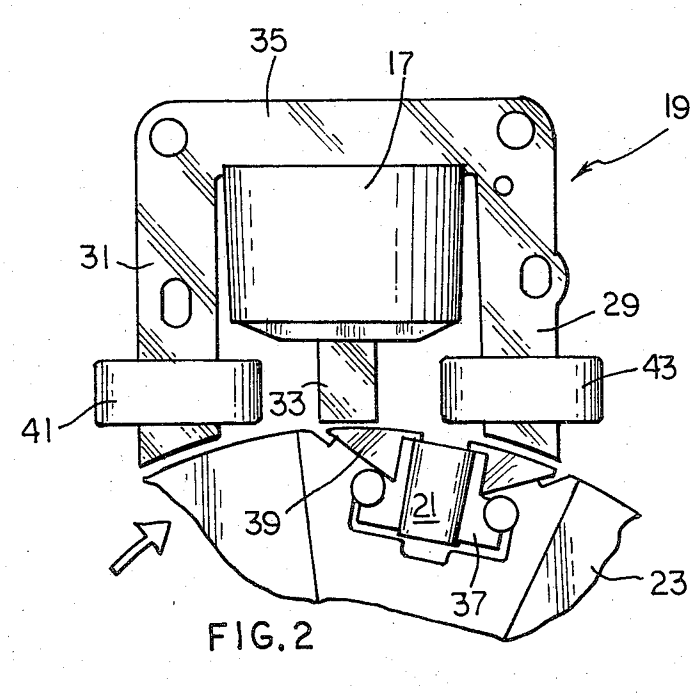
FIG. 2 illustrates the stator and a portion of the flywheel of FIG. 1 in greater detail.

Referring now to FIG. 2, stator core 19 is seen to be a three legged E shaped laminated stator core having outer legs 29 and 31 and a central leg 33 disposed between the outer legs. Respective first ends of the three legs are in close proximity to the engine flywheel 23 while the other ends of each of the legs are coupled together magnetically by base portion 35 of the E shaped core. Leg 33 supports the ignition circuitry 17 including an ignition coil while flywheel 23 supports permanent magnet 21 and connecting pole shoes 37 and 39 creating a north pole at the surface of one of those shoes and a south pole at the surface of the other. The permanent magnet is poled in the tangential direction with the flywheel being otherwise fabricated from a non-magnetic material, such as cast aluminum, so that when the flywheel rotates in the direction indicated by the arrow, stator core legs 31 and 33 are magnetically coupled together and thereafter when the flywheel reaches the position illustrated in FIG. 2, stator core legs 33 and 29 are magnetically coupled together. During the time that the flywheel moves from the first leg coupling position to the leg coupling position illustrated, a flux reversal occurs in stator core leg 33, inducing an ignition voltage in the ignition coil. Capacitor discharge, as well as mechanical or electronic interrupt type ignition circuits may for example be employed and further details of the ignition circuitry 17 are omitted for clarity.

Figure 3:
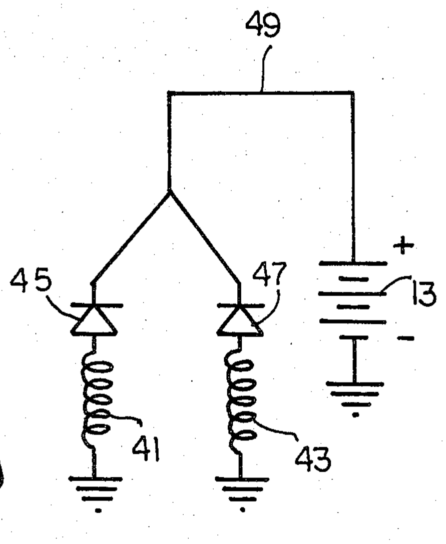
FIG. 3 is a schematic diagram illustrating the battery charging circuitry associated with FIGS. 1 and 2.

Electrically the trickle charger of the present invention employs one or more charging coils, such as 41 and 43 of FIG. 3. Each coil is connected in series with a corresponding diode 45 or 47 and the series coil-diode combinations are connected in parallel and by line 49 to form a closed loop circuit with the battery 13. The coils 41 and 43 may, as illustrated in FIG. 2, be positioned on the outer legs of the E shaped core.

In FIG. 2, as flywheel 23 rotates in a clockwise direction, pole shoe 37 approaches the closely adjacent end of stator core leg 31, moving past that leg and approaching the free end of stator core leg 33. At the time when the legs 31 and 33 are spanned by the pole shoes 37 and 39, the flux through stator core leg 31 is at a maximum, and continued flywheel rotation results in a decrease in that flux. Thus, as the magnetic member of the flywheel approaches and passes the pair of legs 31 and 33, a pulse first in one direction and then of opposite polarity is induced in coil 41. The diode 45 functions to pass only one polarity of this pulse to the battery. In practice, several other pulses of lesser magnitude are also induced in the coil 41, however, the major portion of the charging current is provided by the single induced pulse passed by the diode 45 to the battery. As the flywheel continues to rotate, this same effect is noticed between legs 33 and 29 of the stator core, so that a second primary charging pulse is provided by way of diode 47 to the battery 13. Again, several lesser pulses also pass through the diode to the battery. The actual waveforms for a particular charging configuration are illustrated and discussed in greater detail in copending application Ser. No. 190,899, entitled *MAGNETO BATTERY TRICKLE CHARGER*, filed in the name of John N. MacLeod on even date herewith. The entire disclosure of that application is hereby specifically incorporated by reference.

For a particular line of electric start lawnmowers, a charging current of around 200 milliamps was determined to be sufficient to maintain the battery charge under normal use, and this charging current was achieved in the configuration illustrated in FIGS. 1 through 3, with around 250 turns of No. 24 wire on each of the coils 41 and 43.

Figure 4:
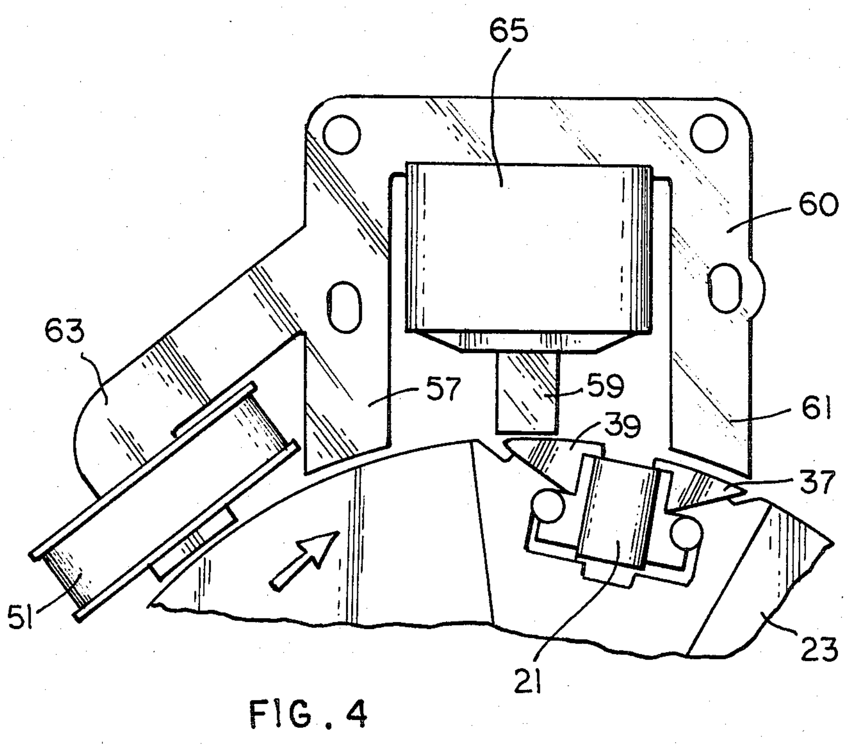
FIG. 4 is a view similar to FIG. 2 but illustrating possible variations thereon.
Figure 5:
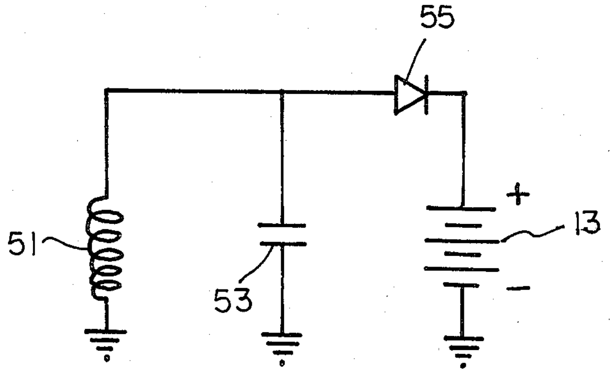
FIG. 5 illustrates modified battery charging circuitry associated with the structure of FIG. 4.
Figure 6:
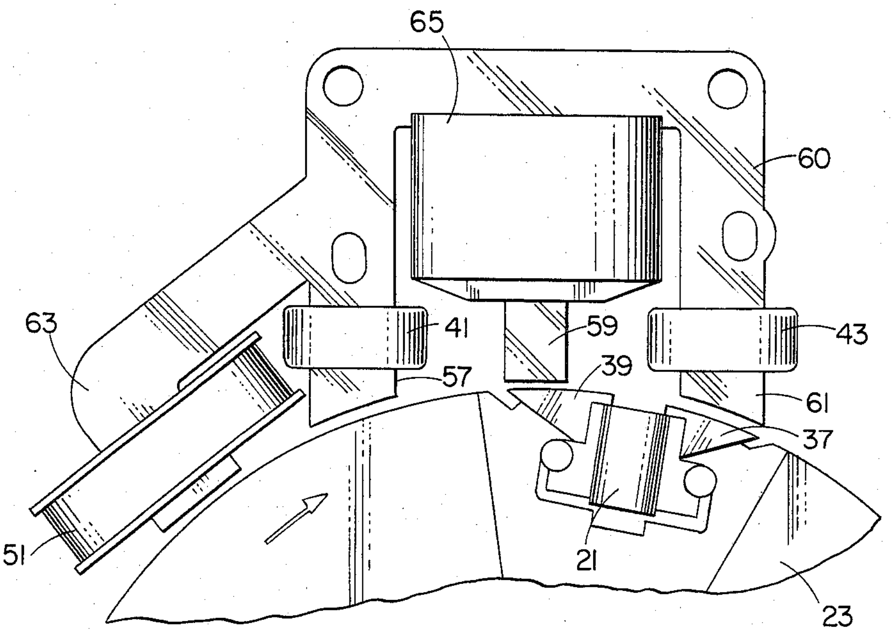
FIG. 6 illustrates the features of FIGS. 2 and 4 in a single installation.
Figure 7:
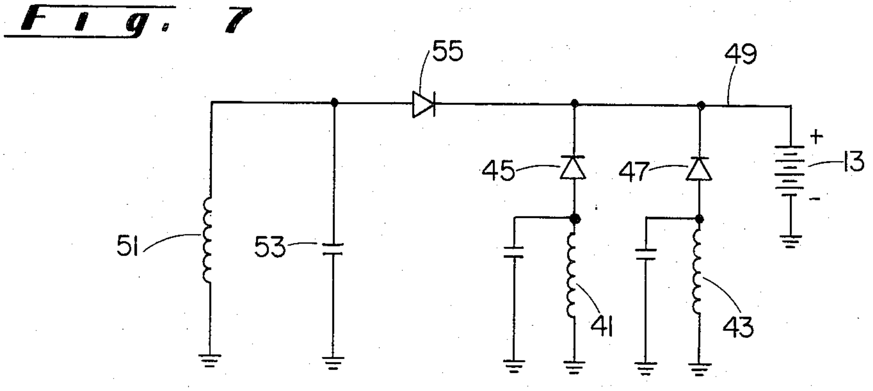
FIG. 7 illustrates the electrical connections for the variation of FIG. 6.

With some ignition circuits manufactured by the applicant's assignee, there is not sufficient room on the stator core legs 29 and 31 for sufficiently large coils to achieve the minimum charging current required to maintain the storage battery, and with these ignition systems, the modification of the stator core illustrated in FIG. 4, is sometimes preferred. In FIGS. 4 and 5, a single charging coil 51 is connected in parallel with a capacitor 53 in accordance with the teaching of the aforementioned copending application, and this parallel combination is connected by way of diode 55 to charge storage battery 13. The ends of the E shaped stator core legs 57, 59 and 61 are as before closely adjacent the outer periphery of flywheel 23 so as to be magnetically coupled in pairs by the magnetic member as that member rotates past the core and the angle subtended by adjacent E legs relative to the flywheel axis is substantially the same as the angular extent of the magnetic member between pole shoes 37 and 39. In FIG. 4, a fourth stator core leg 63 has an end closely adjacent to the flywheel 23 with the low voltage coil 51 surrounding leg 63 so that as the magnetic member of the flywheel approaches and then passes the pair of legs 57 and 63, the pair of oppositely poled pulses discussed previously are induced in the low voltage coil 51. Also as before, only one polarity of this pulse is passed by way of diode 55 to battery 13. The angle subtended by the fourth leg 63, and the adjacent outer leg of the E57, is again substantially the same as the angle extent of the magnetic member.

Numerous modifications and combinations of features as thus far discussed will now suggest themselves to persons of ordinary skill in this art, and each such modification will be characterized by the fact that little or no additional stator core iron is required and the ignition and charging coil structure is formed as one unit. If the ignition circuitry 65 is of the relatively smaller variety, as illustrated in FIG. 4, additional charging coils might be placed on legs 57 and 61. In some cases, only a single coil will be placed on the E shaped core of FIG. 2, while with other ignition systems, perhaps only two such legs are available, one supporting the ignition coil, the other the charging coil. Other such modifications should now be readily apparent.

From the foregoing it is now apparent that a novel arrangement for charging a storage battery, which arrangement is integral with the engine ignition system, has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. In an internal combustion engine powered device having a storage battery, battery energizable engine starter, and an engine ignition system including a three legged E-shaped laminated startor core and a single flywheel supported permanent magnet, an arrangement for charging the storage battery during engine operation comprising a first charging coil on one of the outer "E" legs, a second charging coil on the other of the outer "E" legs, a first diode connected in series with the first charging coil, a second diode connected in series with the second charging coil, and means connecting the two coil-diode series circuits in parallel with one another to the battery to provide a pair of sequential charging current pulses to the battery during each revolution of the flywheel.

2. In an ignition system for an internal combustion engine having a flywheel, a flywheel supported magnetic member comprising a single tangentially poled permanent magnet and a three legged E-shaped stator core with the three leg ends disposed closely adjacent the outer periphery of the flywheel to be magnetically coupled in pairs once during each revolution of the flywheel by the magnetic member as the magnetic member rotates past the core with the angle subtended by adjacent "E" legs relative to the flywheel axis being substantially the same as the angular extent of the magnetic member and with the center leg of the "E" supporting a high voltage ignition coil, the improvement comprising a fourth stator core leg having one end closely adjacent the flywheel, a low voltage coil surrounding the fourth leg a rectifier in series with the low voltage coil for providing a pulsating unidirectional current, storage battery means utilizing electrical energy induced in the low voltage coil by passage of the magnetic member, an additional pair of low voltage coils, one disposed on one outer leg of the "E" and the other disposed on the other outer leg of the "E" intermediate of the high voltage coil supporting center "E" leg and the fourth leg, and rectifiers for each of the additional low voltage coils coupling the additional coils to the storage battery means so that three sequential primary pulses are supplied to charge the storage battery means during each flywheel revolution.

* * * * *